United States Patent Office 3,553,212
Patented Jan. 5, 1971

---

3,553,212
2β,16β-DIAMINO-ANDROSTANES
Colin Leslie Hewett, Glasgow, and David Samuel Savage,
Newton Mearns, Scotland, assignors to Organon Inc.,
West Orange, N.J., a corporation of New Jersey
No Drawing. Continuation-in-part of application Ser. No.
528,358, Feb. 18, 1966. This application Apr. 19, 1968,
Ser. No. 722,545
Claims priority, application Great Britain, Feb. 19, 1965,
7,278/65
Int. Cl. C07c *173/10*
U.S. Cl. 260—239.5        6 Claims

ABSTRACT OF THE DISCLOSURE

2β,16β-diamino-androstane compounds oxygenated in the 3- and 17-positions, wherein the amino groups may be dialkylamino and heterocyclic amino groups, and their acid addition salts and quaternary ammonium salts, are prepared by reacting a 16α, 17α-oxido-, or a 16-keto-steroid with an amine at elevated temperature and pressure, followed by reduction to the corresponding 17β-hydroxy derivative. The compounds of the invention are highly active neuromuscular blocking agents and have a strong influence on the autonomic nervous system.

CROSS-REFENCES TO RELATED APPLICATION

This application is a continuation-in-part of application Ser. No. 528,358, filed Feb. 18, 1966, now abandoned.

BACKGROUND OF THE INVENTION

The present invention relates to novel 2β,16β-diamino-androstanes.

More particularly, it relates to novel 2β,16β-diamino-3,17-dioxygenated androstane compounds.

The invention relates more especially to novel 2β,16β-diaminoandrostanes of the following formula:

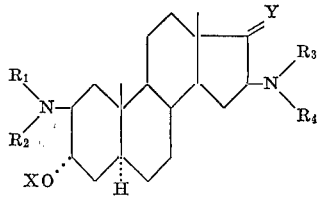

wherein

X=hydrogen or acyl group,
Y=O, H(βOH) or H(βOAcyl), $R_1$ and $R_2$ represent hydrogen, an alkyl or aralkyl group having 1–10 carbon atoms, or when taken together form with the nitrogen atom a heterocyclic amino radical, $R_3$ and $R_4$ represent hydrogen, and alkyl or aralkyl group having 1–10 carbon atoms, or when taken together form with the nitrogen atom a heterocyclic amino radical, and acid-addition or quaternary ammonium salts of these compounds.

$NR_1R_2$ and $NR_3R_4$ may be the same or different.

Particularly, the quaternary ammonium salts of the above compounds derived from alkyl or substituted alkyl halides of which the alkyl group has 1–4 carbon atoms, or quaternary ammonium salts of which the anion is OH or $NO_3$, are very interesting biologically active compounds.

The compounds according to the invention may be prepared by reacting a compound of the formula:

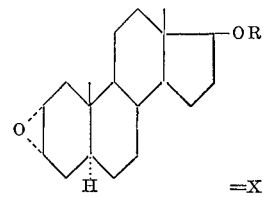

wherein

X=either a 16α,17α-oxido group or a 16-keto group, and
R=H or an acyl group, with an amine of the formula $NHR_1R_2$ and/or $NHR_3R_4$, wherein $R_1,R_2,R_3$ and $R_4$ have the meaning as defined above.

By reaction of a starting product as defined above with an amine of the formula $HNR_1R_2$ for a short period, usually varying between ½–5 hours, the resulting product is mainly the 16β-amino-17-keto-2α,3α-oxidosteroid which may be reacted further for a longer period, usually 35 hours—5 days, with the same or different amine, 2β,16β-diamino-3,17-oxygenated-androstanes as defined above are obtained.

The reaction with the amine $NHR_1R_2$ or $NHR_3R_4$, which may be the same, is carried out at an elevated temperature, usually at 70° to 250° C., if necessary under pressure and in the presence of water.

The resulting 2β,16β - diamino-5α-androstan-3α-ol-17-one compounds may be reduced by means of an alkali metal borohydride, e.g. potassium borohydride, an alkali metal aluminium hydride, e.g. lithum aluminium hydride, sodium triethoxy aluminium hydride, or an alkali metal trialkoxy borohydride, e,g, sodium trimethoxy borohydride, to give the corresponding 17β-hydroxy derivative.

The 3α-hydroxy group may be esterified before reduction in which case the resulting 17β-hydroxyl group may be esterified with a different acid or both hydroxyl groups may be esterified after reduction with the same acid to give the di-ester of the acid.

By the esterification of the 3α- and/or 17β-hydroxyl-group there may be prepared the esters derived from an inorganic acid, e.g. phosphoric acid, or an organic carboxylic acid, preferably having 1–18 carbon atoms, such as acetic acid, butyric acid, valeric acid, caproic acid, oenanthic acid, decanoic acid, lauric acid, trimethyl acetic acid, cyclohexyl butyric acid, phenylpropionic acid, malonic acid and succinic acid.

The alkyl group in the alkylamino- or dialkylamino group, present in 2- and 16-positions is preferably a lower alkyl group having 1–6 carbon atoms.

The tertiary amino groups may be further reacted either before or after reduction of the 17-keto group and either before or after esterification of the 3α- and/or the 17β-hydroxyl groups, with an alkyl halide, e.g. methyl bromide, methyl iodide, ethyl bromide, ethyl iodide to give the bis-quaternary ammonium salts, or with an inorganic or organic acid to give the acid-addition salts, such as hydrochlorides, citrates or pyruvates.

The novel 2,16-diamino-androstanes of the present invention exert a strong influence on the autonomic nervous system, being especially active at the junction of somatic nerves and striated muscle. Their utility is as neuromuscular blocking agents (muscle relaxants) in a manner similar to tubocurarine, although the 2,16-diamino-androstanes do not affect the cardiovascular system, nor do they release histamine. The 2,16-diamino-androstanes of the invention possess unexpected and unobvious properties of great value in the practice of anaesthesiology. Pharmacological studies in a wide range of species, including man, have shown that the bisquaternary salts of 2,16-diaminoandrostanes exhibit potent non-depolarizing (competitive or curariform) neuromuscular blocking (muscle relaxing) properties, such as to cause profound muscle relaxation after intravenous injection during general surgical anesthesia.

The compounds of the invention are intended for human therapy, particularly by intravenous injection, in initial dosages between about 4 and 12 mg., followed if necessary by incremental dosages of 1 to 2 mg.

Thus, the utility and mode of application of the compounds of the invention is illustrated by the compound $2\beta,16\beta$-bis-piperidino - $5\alpha$ - androstane-$3\alpha,17\beta$ - diol diacetate dimethobromide (also known as Pancuronium bromide), which is described in Examples VII to X below. This compound is applied in man by intravenous injection in dosage of 4–12 mg. followed by incremental doses 1–2 mg. to cause muscle relaxation without cardiovascular side-effects under general surgical anesthesia. It has been successfully used in over 600 patients undergoing a wide range of surgical procedures from simple laparotomy to complex cadiac by-pass procedures.

The initial clincal pharmacology of Pancuronium bromide has been described by W. L. M. Baird and A. M. Reid, Brit. J. Anaesthesia, 39 775–780 (1967). The pharmacology of this compound in a wide range of animal species was described by W. R. Buckett et al., Brit. J. Pharmacol. 32, 671–682, (March 1968).

A second compound of the class comprised in the present invention, namely $2\beta,16\beta$-bis-piperidino-$5\alpha$-androstane-$3\alpha,17\beta$-diol $3\alpha$-acetate dimethorbromide (see Example XVI below), when tested in pentobarbitone anaesthetized baboons of 20 kg. body weight produced profound muscle relaxation in a similar dosage to tubocurarine, namely (0.02–0.1 mg. per kg.), such relaxation being less than half the duration of tubocurarine. This short duration could be valuable in human anaesthesia, in dosages of 15 to 30 mg. administered intravenously.

A third compound $2\beta,16\beta$-bis-piperidino-$5\alpha$-androstane-$3\alpha,17\beta$-diol dibenzoate dimethobromide (see Example XIX below) has been shown in anaesthetized cats to have a longer duration than any heretofore known neuromuscular blocking agent.

In comparison with the known 2-aminoandrostanes and the known 16-aminoandrostanes, the 2,16-diaminoandrostanes of the present invention exhibit unexpected and different modes of action. Thus, the 2-monoamino compound $3\alpha$-hydroxy-$2\beta$-morpholino-$5\alpha$-androstane - 17 - one, described as compound V in the article by Hewett et al., J. Pharm. Pharmac. 16, 765–767 (1964), produces loss of righting reflex in mice, such action being due to a mechanism other than neuromuscular blockade.

16-monoamino-androstane bases, for example, $16\beta$-morpholino-$3\beta$-hydroxy-$5\alpha$-androstane-17-one, disclosed by Overbeek and Bonta, in Hormonal Steroids, vol. 1 (1964), shows antistrychnine activity. A quaternary 16-monoamino - androstane salt, namely $16\beta$ - piperidino - $5\alpha$-androstane-$17\beta$-ol acetate methobromide, produces sedation in mice at nontoxic dose levels and is devoid of neuromuscular blocking activity. This is in great contrast to the potent neuromuscular blocking activity produced by the corresponding 2,16-diamino compound of the invention, viz the compound Pancuronium bromide, described above.

DESCRIPTION OF THE PREFERRED EMBODIMENTS

The following examples illustrate the invention in greater detail.

Example I.—$2\beta,16\beta$-bis-piperidino-$5\alpha$-androstan-$3\alpha$-ol-17-one (i) A solution of $2\alpha,3\alpha,16\alpha,17\alpha$-diepoxy-$17\beta$-acetoxy-$5\alpha$-androstane (25 g.), prepared from 3,17-diacetoxy-$5\alpha$-androstane-2,16-diene (Chem. Abs. 1960, 54, 8908) by treatment with m-chlor-per-benzoic acid, in piperidine (120 ml.) and water (40 ml.) was boiled under reflux for 5 days, the solution was concentrated and the product precipitated by the addition of water. The solid was collected, dissolved in dilute hydrochloric acid, filtered to give a clear solution and precipitated by the addition of sodium hydroxide solution. Crystallisation from acetone gave $2\beta,16\beta$-bis-piperidino-$5\alpha$-androstan-$3\alpha$-ol - 17 - one (18.9), M.P. 179–185° C.

(ii) The diepoxide (1 g.) was treated with alcoholic potassium hydroxide solution and the product crystallized from methanol to give $2\alpha,3\alpha$-epoxy-$5\alpha$-androstan-$17\beta$-ol-16-one (0.25 g.) which was boiled under reflux with piperidine (10 ml.) and water (1 ml.) for 4 days. The product was worked up in the usual manner and crystallized from acetone to give the same bis-piperidino-androstanolone (0.2 g.).

Example II.—$2\beta,16\beta$-bis-morpholino-$5\alpha$-androstan-$3\alpha$-ol-17-one (i) A solution of the diepoxide (2 g.) in mopholine (10 ml.) and water (2 ml.) was boiled under reflux for 48 hours, the solution cooled and the product precipitated by addition of water. The solid was filtered off, washed with water, dried and crystallised from acetone to give the bis-morpholine-androstanolone (1 g.), M.P. 214–216° C.

(ii) In a manner similar to Example I (ii), the same bis-morpholino-androstanolone was obtained by refluxing $2\alpha,3\alpha$-epoxy-$5\alpha$-androstan-$17\beta$-ol-16-one with morpholine.

Example III

In a manner similar to Example I (i), bis-(3'-azabicyclo-[3',2',2']-nonano)-androstanolone was prepared by heating the diepoxide, under reflux, with the appropriate amine in iso-amyl alcohol containing water equivalent to 10% by weight of the amino.

Example IV

Bis-dimethylamino-, bis-diethylamino - bis - dipropylamino-, bis-diisopropylamino- and bis-dibutylamino-androstanolone were prepared by heating the di-epoxide with the appropriate amine containing 10% of water in an autoclave at 200–250° C. for 48 hours.

Example V.—$2\alpha,3\alpha$-epoxy-$16\beta$-pyrrolidino-$5\alpha$-androstan-17-one A solution of $2\alpha,3\alpha$-epoxy-$5\alpha$-androstan-$17\beta$-ol-16-one (20 g.) in pyrrolidine (80 ml.) was boiled under reflux for 2½ hours and evaporated to dryness under reduced pressure. The residual gum was extracted with dilute hydrochloric acid, the solution filtered free of insoluble material and the basic fraction precipitated by the addition of 10 N potassium hydroxide solution of the filtrate. The basic material was extracted with ether, the extract washed neutral with water and dried (MgSO$_4$). The extract was evaporated to dryness, the residue dissolved in n-hexane-benzene (1:1) and precolated down a column (8 x 1" dia.) of alumina. Elution with n-hexane-benzene (1:1) gave $2\alpha,3\alpha$-epoxy-$16\beta$-pyrrolidino-$5\alpha$-androstan-17-one.

In a similar manner the following were prepared:

$2\alpha,3\alpha$-epoxy-$16\beta$-morpholino-$5\alpha$-androstan-17-one
$2\alpha,3\alpha$-epoxy-$16\beta$-piperidino-$5\alpha$-androstan-17-one
$2\alpha,3\alpha$-epoxy-$16\beta$-dimethylamino-$5\alpha$-androstan-17-one Example VI.—$2\beta$-piperidino-$16\beta$-pyrrolidino-$5\alpha$-androstan-$3\alpha$-ol-17-one A solution of the epoxy-pyrrolidinoandrostanolone (5 g.) from Example V in water (3 ml.) and piperidine (22 ml.) was boiled under reflux for 70 hours. The product was precipitated by the addition of water and extracted with methylene chloride. The extract was well washed with water, dried (MgSO$_4$), filtered and evaporated to dryness. The residual gum was dissolved in benzene and filtered down a column (8 x 1" dia.) of alumina. Elution with benzene:ether mixtures yielded fractions which were crystallized from acetone and then from ether to give 2β-piperidino-16β-pyrrolidino-5α-androstan-3α-ol-17 - one in small prisms, M.P. 174–180° C.

In a similar manner the following were prepared:

2β,16β-bis-pyrrolidino-5α-androstan-3α-ol-17-one
2β-piperidino-16β-morpholino-5α-androstan-3α-ol-17-one
2β-piperidino-16β-dimethylamino-5α-androstan-3α-ol-17-one Example VII.—2β,16β-bis-piperidino-5α-androstane-3α,17β-diol A solution of sodium borohydride (8 g.) in water (16 ml.) was added to a stirred solution of 2β,16β-bis-piperidino-5α-androstan-3α-ol-17-one (17 g.) in tetrahydrofuran (70 ml.) and methanol (30 ml.) and the solution stirred at room temperature for 16 hours. The product was precipitated by the addition of water, filtered off, dried, and crystallised from acetone to give the diol (14.9 g.).

In a similar manner the following substances were prepared:

Bis-morpholino-androstanediol
Bis-dimethylamino-androstanediol
Bis-diethylamino-androstanediol
Bis-dipropylamino-androstanediol
Bis-di-isopropylamino-androstanediol
Bis-dibutylamino-androstanediol
Bis-3′-azabicyclo[3′,2′,2′]-nonano-androstanediol
2β-piperidino-16β-pyrrolidino-androstanediol
2β,16β-bis-pyrrolidino-androstanediol
2β-piperidino-16β-morpholino-androstanediol
2β-piperidino-16β-dimethylamino-androstanediol The last compound was also prepared by reducing 2α,3α-epoxy-16β-dimethylamino-5α-androstan-17-one to the 17β-alcohol with sodium borohydride before condensing with aqueous piperidine.

When crude 2β,16β-piperidino-5α-androstan-3α-ol-17-one containing some 2β,16α-bis-piperidino-5α-androstan-3α-ol-17-one was reduced with sodium borohydride the product on fractional crystallisation from ether gave 2β,16α-bis-piperidino-5α-androstane-3α,17α - diol, M.P. 245–249° C.

Example VIII.—2β,16β-bis-piperidino-3α,17β-diacetoxy-5α-androstane

A solution of the piperidino-diol (9 g.) from Example III in acetic anhydride (18 ml.) was heated at 90° C. for 1 hour, the solution cooled, excess acetic anhydride destroyed by the careful addition of water, and the resulting solution carefully made alkaline with 2 N caustic soda solution to precipitate a solid product. The solid was dried, extracted with n-hexane and the solution filtered free of insoluble material before percolation down a column (4 x 1" dia.) of alumina. Elution with n-hexane gave a fraction (4.2 g.) which was crystallised twice from ether to give the diacetate, M.P. 176–180° C.

In a similar manner the following were prepared:

Bis-morpholino-androstanediol diacetate
Bis-dimethylamino-androstanediol diacetate
Bis-diethylamino-androstanediol diacetate
Bis-dipropylamino-androstanediol diacetate
Bis-di-isopropylamino-androstanediol-diacetate
Bis-dibutylamino-androstanediol-diacetate
Bis-3′-azabicyclo[3′,2′,2′]nonano-androstanediol diacetate
2β-piperidino-16β-pyrrolidino-androstanediol diacetate
2β,16β-bis-pyrrolidino-androstanediol diacetate
2β-piperidino-16β-morpholino-androstanediol diacetate
2β-piperidino-16β-dimethylamino-androstanediol diacetate
2β,16α-dipiperidino-androstane-3α,17α-diol diacetate Example IX.—2β,16β-bis-piperidino-5α-androstane-3α,17β-diol bis-methobromide Methyl bromide (17 g.) was added to a solution of the bis-piperidino-diol from Example III (3 g.) in methylene chloride (10 ml.) and the resulting solution allowed to stand at rom temperature for 4 days before evaporating the solution to dryness. The residue was triturated with ether and the bis-methobromide (4 g.), M.P. 219–220° C. filtered off.

By using methyl iodide in place of the methyl bromide the corresponding metho-iodide was obtained.

By using ethyl iodide in place of the methyl bromide the corresponding etho-bromide was obtained.

In a similar manner the following were prepared:

Bis-pyrrolidino-androstanediol bis-methobromide
Bis-dimethylamino-androstanediol bis-methobromide
Bis-diethylamino-androstanediol bis-methobromide
2β-piperidino-16β-pyrrolidino-androstanediol bis-methobromide
2β-piperidino-16β-morpholino-androstanediol bis-methobromide
2β-piperidino-16β-dimethylamino-androstanediol bis-methobromide
Bis-morpholino-androstanediol bis-methiodide
2β,16α-bis-piperidino-androstane-3α,17α-diol bis-methobromide Example X.—2β,16β-bis-piperidino-3α,17β-diacetoxy-5α-androstane-bis-methobromide Methyl bromide (17 g.) was added to a solution of the bis-piperidinodiacetate (4 g.) in methylene chloride (10 ml.) and the resulting solution allowed to stand at room temperature for 4 days. The solution was evaporated to dryness, the residue triturated with ether, and filtered to give the bis-methobromide (5.2 g.), M.P. 206° C. Recrystallisation from acetone-methylene chloride gave material M.P. 214–217° C.

By using methyl iodide in place of methyl bromide the corresponding metho-iodide was obtained.

By using ethyl iodide in place of methyl bromide the corresponding etho-iodide was obtained.

In a similar manner the following were prepared:

Bis-pyrrolidino-androstanediol diacetate bis-methobromide
Bis-dimethylamino-androstanediol diacetate bis-methobromide
Bis-diethylamino-androstanediol diacetate bis-methobromide
2β-piperidino-16β-pyrrolidino-androstanediol diacetate bis-methobromide
2β-piperidino-16β-morpholino-androstanediol diacetate bis-methobromide
2β-piperidino-16β-dimethylamino-androstanediol diacetate bis-methobromide
Bis-morpholino-androstanediol diacetate bis-methiodide
2β,16α-bis-piperidino-androstane-3α,17α-diol diacetate bis-methobromide Example XI Bis-morpholino-androstanediol diacetate (1 g.) in methyl iodide (5 ml.) was allowed to stand for 2 days and the excess methyl iodide distilled off. The residue was triturated with ether and the solid crystallised from acetone to give the bis-morpholino-androstanediol diacetate bis-meth-iodide.

In a similar manner the bis-etho-iodide was prepared from ethyl iodide.

Example XII

Bis-piperidino-androstane-diol diacetate (1 g.) and p-chlor-benzyl chloride (5 g.) were heated together for 8 hours, cooled and diluted with ether. Bis piperidino-androstanediol diacetate bis-p.chlor-benzylo chloride was precipitated and purified by crystallisation from acetone.

In a similar manner the bis-dibenzylo chloride was obtained using benzyl chloride.

Example XIII

Bis-piperidino - androstanediol diacetate bis - methobromide (or iodide) was dissolved in water and a solution of silver nitrate added until all the halogen had been replaced by nitrate. The silver halide was filtered off, the solution evaporated under reduced pressure and the residue extracted with acetone. Concentration of the acetone gave bis-piperidino-androstane diol diacetate bis-metho nitrate.

Example XIV

Bis-piperidino-androstanediol diacetate bis-metho-bromide (2 g.) in water (20 ml.) was percolated down a column of anion exchange resin (Amberlite C.G. 400 Cl; 20 g.). The thus treated solution was evaporated to dryness under reduced pressure and the residue crystallised from acetone to give bis-piperidino-androstanediol diacetate bis-metho chloride.

Example XV

A solution of bis-piperidino-androstanediol diacetate bis-metho-bromide (2 g.) in water (20 ml.) was shaken with freshly prepared silver hydroxide until the solution was free from bromide ion. The solution was then filtered and evaporated to dryness under reduced pressure to give bis-piperidino-androstanediol diacetate bis-metho hydroxide.

Example XVI

Bis-piperidino-androstanolone (5 g.) was heated with acetic anhydride (10 ml.) at 90° C. for 30 minutes, cooled and excess acetic anhydride decomposed by careful addition of water. The resulting 3-acetate was isolated by carefully basifying the solution with 2 N caustic soda solution.

A better product was obtained by carrying out this reaction in a solution of methylene chloride (15 ml.) at about 20° C. for 30 minutes decomposing the excess anhydride with water and carefully basifying with 2 N caustic soda solution. After drying the methylene chloride solution ($Na_2SO_4$) and evaporating to dryness the residue was crystallised from acetone to give bis-piperidino-androstanolone acetate (5.1 gm.) which was reduced with sodium borohydride in a manner similar to that described in Example VII to give bis-piperidino-androstane-diol-3-acetate.

Esterification of this mono acetate with propionic anhydride at 90° C. for ½ hour yielded bis-piperidino-androstane-diol 3-acetate-17-propionate.

In a similar manner 2$\beta$-piperidino - 16$\beta$ - pyrrolidino-androstane-3$\alpha$,17$\beta$-diol 3-acetate and 3-acetate - 17-propionate were prepared.

In a similar manner the following were prepared:

2$\beta$,16$\beta$-bis-pyrrolidino-5$\alpha$-androstan-3$\alpha$-ol-17-one acetate
2$\beta$,16$\beta$-bis-morpholino-5$\alpha$-androstan-3$\alpha$-ol-17-one acetate
2$\beta$,16$\beta$-dimethylamino-5$\alpha$-androstan-3$\alpha$-ol-17-one acetate
2$\beta$-piperidino-16$\beta$-morpholino-5$\alpha$-androstan-3$\alpha$-ol-17-one acetate
2$\beta$-piperidino-16$\beta$-dimethylamino-5$\alpha$-androstan-3$\alpha$-ol-17-one acetate
2$\beta$,16$\beta$-bis-pyrrolidino-5$\alpha$-androstane-3$\alpha$,17$\beta$-diol 3-acetate
2$\beta$,16$\beta$-bis-morpholino-5$\alpha$-androstane-3$\alpha$,17$\beta$-diol 3-acetate
2$\beta$,16$\beta$-bis-dimethylamino-5$\alpha$-androstane-3$\alpha$,17$\beta$-diol 3-acetate
2$\beta$-piperidino-16$\beta$-morpholino-5$\alpha$-androstane-3$\alpha$,17$\beta$-diol 3-acetate
2$\beta$,16$\beta$-bis-pyrrolidino-5$\alpha$-androstane-3$\alpha$,17$\beta$-diol 3-acetate 17-propionate
2$\beta$,16$\beta$-bis-morpholino-5$\alpha$-androstane-3$\alpha$,17$\beta$-diol 3-acetate 17-propionate
2$\beta$,16$\beta$-bis-dimethylamino-5$\alpha$-androstane-3$\alpha$,17$\beta$-diol 3-acetate 17-propionate
2$\beta$-piperidino-16$\beta$-morpholino-5$\alpha$-androstane-3$\alpha$,17$\beta$-diol 3-acetate 17 propionate
2$\beta$-piperidino-16$\beta$-dimethylamino-5$\alpha$-androstane-3$\alpha$,17$\beta$-diol-3-acetate 17-propionate

Example XVII

Bis-piperidino - androstanolone-3 - acetate (2 g.) was reacted with methyl bromide (10 ml.) in methylene chloride (7.5 ml.) for 5 days. Evaporation of the solution and trituration with ether gave bis-piperidino-androstanolone-3-acetate bis-methobromide.

By using methyl iodide in place of the methyl bromide the corresponding bis-metho-iodide was obtained.

In a similar manner the bis-methobromides and the bis-methiodides of the following were prepared:

2$\beta$,16$\beta$-bis-pyrrolidino-5$\alpha$-androstan-3$\alpha$-ol-17-one acetate
2$\beta$,16$\beta$-morpholino-5$\alpha$-androstan-3$\alpha$-ol-17-one acetate
2$\beta$,16$\beta$-bis-dimethylamino-5$\alpha$-androstan-3$\alpha$-ol-17-one
2$\beta$-piperidino-16$\beta$-morpholino-5$\alpha$-androstan-3$\alpha$-ol-17-one acetate
2$\beta$-piperidino-16$\beta$-dimethylamino-5$\alpha$-androstan-3$\alpha$-ol-17-one-acetate
2$\beta$,16$\beta$-bis-pyrrolidino-5$\alpha$-androstane-3$\alpha$,17$\beta$-diol 3-acetate
2$\beta$,16$\beta$-bis-morpholino-5$\alpha$-androstane-3$\alpha$,17$\beta$-diol 3-acetate
2$\beta$,16$\beta$-bis-dimethylamino-5$\alpha$-androstane-3$\alpha$,17$\beta$-diol 3-acetate
2$\beta$-piperidino-16$\beta$-morpholino-5$\alpha$-androstane-3$\alpha$,17$\beta$-diol 3-acetate
2$\beta$-piperidino-16$\beta$-dimethylamino-5$\alpha$-androstane-3$\alpha$,17$\beta$-diol 3-acetate

Example XVIII.—2$\beta$,16$\beta$-bis-piperidino-5$\alpha$-androstane-3$\alpha$,17$\beta$-diol dipropionate A solution of the diol (2 gm. Ex. VII) was treated with propionic anhydride at 90° C. for 1 hour and the product worked up in the usual manner before crystallising from acetone to give the dipropionate as a crystalline solid (660 mg.).

In a similar manner the following were prepared:

Bis-morpholino-androstanediol dipropionate
Bis-dimethylamino-androstanediol dipropionate
Bis-diethylamino-androstanediol dipropionate
Bis-dipropylamino-androstanediol dipropionate
Bis-di-isopropylamino-androstanediol dipropionate
Bis-dibutylamino-androstanediol-dipropionate
Bis-3'-azabicyclo[3',3',2']nonano-androstanediol dipropionate
2$\beta$-piperidino-16$\beta$-pyrrolidino-androstanediol dipropionate
2$\beta$,16$\beta$-bis-pyrrolidino-androstanediol dipropionate
2$\beta$-piperidino-16$\beta$-morpholino-androstanediol dipropionate
2$\beta$-piperidino-16$\beta$-dimethylamino-androstanediol dipropionate
2$\beta$,16$\alpha$-bis-piperidino-androstane-3$\alpha$,17$\alpha$-diol dipropionate

Example XIX.—2$\beta$,16$\beta$-bis-piperidino-5$\alpha$-androstane-3$\alpha$,17$\beta$-diol dibenzoate Benzoyl chloride (6 ml.) was added to a solution of the diol (6 g.) in methylene chloride (24 ml.) and the solution allowed to stand at room temperature overnight. The solution was washed with water and extracted with excess sodium bicarbonate solution, washed with water and dried ($Na_2SO_4$). Evaporation to dryness yielded a gum which was triturated with ether to give the dibenzoate as a crystalline solid (5 g.) M.P. 155°–175° C.

In a similar manner the following were prepared:

Bis-morpholino-androstanediol dibenzoate
Bis-dimethylamino-androstanediol dibenzoate
Bis-diethylamino-androstanediol dibenzoate Bis-dipropylamino-androstanediol dibenzoate
Bis-di-isopropylamino-androstanediol dibenzoate
Bis-dibutylamino-androstanediol dibenzoate
Bis-3'azabicyclo[3',2',2']nonano-androstanediol dibenzoate
2β-piperidino-16β-pyrrolidino-androstanediol dibenzoate
2β,16β-bis-pyrrolidino-androstanediol dibenzoate
2β-piperidino-16β-morpholino-androstanediol dibenzoate
2β-piperidino-16β-dimethylamino-androstanediol dibenzoate
2β,16α-bis-piperidino-androstane-3α,17α-diol dibenzoate Example XX.—2β,16β-bis-piperidino-5α-androstane-3α,17β-diol bis-phenylacetate Treatment of the diperidino-diol with phenylacetyl chloride in methylene chloride solution gave the bis-phenylacetate.

In a similar manner the following were prepared:

Bis-morpholino-androstanediol bis-phenylacetate
Bis-dimethylamino-androstanediol bis-phenylacetate
Bis-diethylamino-androstanediol bis-phenylacetate
Bis-dipropylamino-androstanediol bis-phenylacetate
Bis-di-isopropylamino-androstanediol bis-phenylacetate
Bis-dibutylamino-androstanediol bis-phenylacetate
Bis-3'-azabicyclo[3',2',2']nonano-androstanediol bis-phenylacetate
2β-piperidino-16β-pyrrolidino-androstanediol bis-phenylacetate
2β,16β-bis-pyrrolidino-androstanediol bis-phenylacetate
2β-piperidino-16β-morpholino-androstanediol bis-phenylacetate
2β-piperidino-16β-dimethylamino-androstanediol bis-phenylacetate
2β,16α-bis-piperidino-androstane-3α,17α-diol bis-phenylacetate Example XXI.—2β,16β-bis-piperidino-5α-androstane-3α,17β-diol 3-benzoate The 2β,16β-bis-piperidino - 5α - androstan - 3α-ol-17-one (20 g.) was treated with benzoyl chloride (12 ml.) in pyridine solution at 7° for 2 hours. The product was extracted with ether and worked up in the usual manner to give the 3-benzoate (23.8 g.). Reduction with sodium borohydride in ethanol solution and crystallisation from methylene chloride and acetone yielded the 3α-benzoate of the 3α,17β-diol (12.6 g.).

In a similar manner the following were prepared:

2β,16β-bis-pyrrolidino-5α-androstan-3α-ol-17-one benzoate
2β,16β-bis-morpholino-5α-androstan-3α-ol-17-one benzoate
2β,16β-bis-dimethylamino-5α-androstan-3α-ol-17-one benzoate
2β-piperidino-16β-morpholino-5α-androstan-3α-ol-17-one benzoate
2β-piperidino-16β-dimethylamino-5α-androstan-5α-ol-17-one benzoate
2β,16β-bis-pyrrolidino-5α-androstane-3α,17β-diol 3-benzoate
2β,16β-bis-morpholino-5α-androstane-3α,17β-diol 3-benzoate
2β,16β-bis-dimethylamino-5α-androstane-3α,17β-diol 3-benzoate
2β-piperidino-16β-morpholino-5α-androstane-3α,17β-diol 3-benzoate
2β-piperidino-16β-dimethylamino-5α-androstane-3α,17β-diol 3-benzoate Example XXII.—2β,16β-bis-piperidino-5α-androstan-3α-ol-17-one propionate A solution of bis-piperidino-androstanolone (5 g.) in methylene chloride (15 ml.) was treated with propionic anhydride (10 ml.) at about 20° C. for 30 minutes. Water was added and the methylene chloride solution washed with water, 2 N caustic soda solution, water and dried (Na₂SO₄). Evaporation to dryness and crystallisation of the residual gum gave the 3-propionate.

In a similar manner the following were prepared:

Bis-morpholino-androstanolone propionate
Bis-pyrrolidino-androstanolone propionate
Bis-dimethylamino-androstanolone propionate
2β-piperidino-16β-pyrrolidino-androstanolone propionate
2β-piperidino-16β-dimethylamino-androstanolone propionate Example XXIII.—2β,16β-bis-piperidino-5α-androstane-3α,17β-diol 3-propionate 17-acetate Sodium borohydride (2.5 g.) was added portionwise to a solution of bis-piperidino-androstanolone propionate (4 g.) in methylene chloride (10 ml.) and methanol (10 ml.). Water was added to the solution and the product extracted with methylene chloride; the extract was washed with water, dried (Na₂SO₄) and evaporated to dryness. The residue was crystallised from ether-methanol to give 2β,16β-bis-piperidino-5α-androstane-3α,17β-diol 3-propionate.

Acetylation in the usual manner gave the 3-propionate 17-acetate.

In a similar manner the following were prepared:

Bis-morpholino-androstanediol 3-propionate 17-acetate
Bis-pyrrolidino-androstanediol 3-propionate 17-acetate
Bis-dimethylamino-androstanediol 3-propionate 17-acetate
2β-piperidino-16β-pyrrolidino-androstanediol 3-propionate 17-acetate
2β-piperidino-16β-dimethylamino-androstanediol 3-propionate 17-acetate Example XXIV.—2β,16β-bis-piperidino-5α-androstane-3α,17β-diol 17-acetate Excess hydrochloric acid gas was bubbled through a solution of 2β,16β-bis-piperidino-5α-androstan-3α-ol-17-one (10 g.) in benzene (100 ml.). The supernatant benzene solution was decanted and the residual gum triturated with ether to give a solid which was filtered off and washed with ether. This solid was suspended in ethyl vinyl ether (100 ml.) and p-toluene sulphonic acid (20 mg.) added portionwise over 15 min. to the stirred suspension. The suspension was stirred for 3 days before adding solid potassium carbonate and then excess 10% potassium carbonate solution. The ethyl vinyl ether layer was washed with the carbonate solution which was separated off and extracted with benzene. The ether and benzene solutions were combined and washed neutral with water and dried (Na₂SO₄). The solution was evaporated to dryness to give an orange oil which was dissolved in benzene and percolated down a column (6 x 1″ dia.) of alumina. Elution with benzene and evaporation of the solvent gave a fraction containing only-3α-(1'-ethoxyethyl) ethers (11 g.).

The mixture of the 3-ethoxyethyl ethers (11 g.) was dissolved in methanol 9 (100 ml.) containing sodium borohydride (200 mg.). A further quantity (2.8 g.) of borohydride was added carefully over the next 30 min. and stirring continued/continued for another 30 min. The precipitated crystalline 2β,16β-bis-piperidino-5α-androstane-3α,17β-diol 3-ethoxyethyl ethers (4 g.) were dissolved in pyridine (6 ml.), acetic anhydride (6 ml.) added and the solution kept at room temperature overnight. Water was added and the solution brought to approximately pH 9 by addition of saturated potassium bicarbonate solution. The solution was immediately extracted with ether, the extract washed with water and dried (Na₂SO₄). Evaporation of the ether solution gave a colourless gum (1.9 g.) which was dissolved in methanol (10 ml.) and conc. hydrochloric acid (1 ml.) added.

After five min. the solution was taken to pH 9 by careful addition of saturated potassium bicarbonate solution before extracting with ether. The extract was washed with water, dried (Na$_2$SO$_4$) and evaporated to dryness leaving 2β,16β-piperidino-5α-androstane-3α,17β-diol 17-acetate in colourless plates (3.1 g.).

In a similar manner the following were prepared:

Bis-morpholino-androstanediol 17-acetate
Bis-dimethylamino-androstanediol 17-acetate
Bis-diethylamino-androstanediol 17-acetate
Bis-dipropylamino-androstanediol 17-acetate
Bis-di-isopropylamino-androstanediol 17-acetate.
Bis-dibutylamino-androstanediol 17-acetate
Bis-3'-azabicyclo[3',2',2']nonano-androstanediol 17-acetate
2β-piperidino-16β-pyrrolidino-androstanediol 17-acetate
2β,16β-bis-pyrrolidino-androstanediol 17-acetate
2β-piperidino-16β-morpholino-androstanediol 17-acetate
2β-piperidino-16β-dimethylamino-androstanediol 17-acetate Example XXV.—2β,16β-bis-piperidino-5α-androstan-3α-ol-17-one bis-methobromide Methyl bromide (10 g.) was added to a solution of the bis-piperidino-ketol (5 g.) in methylene chloride (15 ml.) and the solution kept at room temperature in a sealed container for 10 days. The solution was evaporated to dryness, the residual gum dissolved in acetone and ether added to this solution to precipitate the bis-methobromide (6 g.).

In a similar manner the following were prepared:

2β,16β-bis-pyrrolidino-5α-androstan-3α-ol-17-one-bis-methobromide
2β,16β-bis-dimethylamino-5α-androstan-3α-ol-17-one bis-methobromide
2β-piperidino-16β-dimethylamino-5α-androstan-3α-ol-17-one bis-methobromide
2β,16β-bis-morpholino-5α-androstan-3α-ol-17-ol bis-methiodide
2β-piperidino-16β-morpholino-5α-androstan-3α-ol-17-one bis-methiodide Example XXVI.—2β,16β-bis-piperidino-5α-androstane-3α,17β-diol dibenzoate bis-methobromide.

A solution of the dibenzoate (4 g.) and methyl bromide (24 g.) in methylene chloride (30 ml.) was maintained at 50° C. in an autoclave for 16 hr. The solution was evaporated to dryness, the residue extracted with water and filtered free of insoluble material. The water solution was evaporated to dryness under reduced pressure and then residual water removed by azeotropic distillation with benzene. Crystallisation from acetone gave the corresponding bis-methobromide (2 g.).

In a similar manner the following were prepared:

Bis-dimethylamino-androstanediol dibenzoate bis-methobromide
Bis-diethylamino-androstanediol dibenzoate bis-methobromide
2β-piperidino-16β-pyrrolidino-androstanediol dibenzoate bis-methobromide
2β,16β-bis-pyrrolidino-androstanediol dibenzoate bis-methobromide
2β-piperidino-16β-morpholino-androstanediol dibenzoate bis-methobromide
2β-piperidino-16β-dimethylamino-androstanediol dibenzoate bis-methobromide
2β,16α-bis-piperidino-androstane-3α,17α-diol dibenzoate bis-methobromide
Bis-dimethylamino-androstanediol-bis-phenylacetate bis-methobromide
Bis-diethylamino-androstanediol-bis-phenylacetate bis-methobromide
2β-piperidino-16β-pyrrolidino-androstanediol bis-phenylacetate bis-methobromide
2β,16β-bis-pyrrolidino-androstanediol bis-phenylacetate bis-methobromide
2β-piperidino-16β-morpholino-androstanediol bis-phenylacetate bis-methobromide
2β-piperidino-16β-dimethylamino-androstanediol bis-phenylacetate bis-methobromide
2β,16α-bis-piperidino-androstane-3α,17α-diol bis-phenylacetate bis-methobromide Example XXVII.—2β,16β-bis-piperidino-5α-androstane-3α,17β-diol 3-acetate 17-propionate bis-methobromide A solution of the bis-piperidino-5α-androstane-diol acetate propionate (5.8 g.) and methyl bromide (7 g.) in methylene chloride (20 ml.) was kept at room temperature for 4 days. The solution was evaporated to dryness and the residue crystallised from methylene chloride: acetone to give the bis-methobromide (14 g.).

In a similar manner the following were prepared:

Bis-dimethylamino-androstanediol 3-acetate 17-propionate bis-methobromide
Bis-diethylamino-androstanediol 3-acetate 17-propionate bis-methobromide
Bis-dipropylamino-androstanediol 3-acetate 17-propionate bis-methobromide
Bis-di-isopropylamino-androstanediol 3-acetate 17-propionate bis-methobromide
Bis-dibutylamino-androstanediol 3-acetate 17-propionate bis-methobromide
Bis-3'-azabicyclo[3',2',2']nonano-androstanediol 3-acetate 17-propionate bis-methobromide
2β-piperidino-16β-pyrrolidino-androstanediol 3-acetate 17-propionate bis-methobromide
2β,16β-bis-pyrrolidino-androstanediol 3-acetate 17-propionate bis-methobromide
2β-piperidino-16β-dimethylamino-androstanediol 3-acetate 17-propionate bis-methobromide
Bis-dimethylamino-androstanediol 3-propionate 17-acetate bis-methobromide
Bis-diethylamino-androstanediol 3-propionate 17-acetate bis-methobromide
Bis-dipropylamino-androstanediol 3-propionate 17-acetate bis-methobromide
Bis-di-isopropylamino-androstanediol 3-propionate 17-acetate bis-methobromide
Bis-dibutylamino-androstanediol 3-propionate 17-acetate bis-methobromide
Bis-3'-azabicyclo[3',2',2']nonano-androstanediol 3-propionate 17-acetate bis-methobromide
2β-piperidino-16β-pyrrolidino-androstanediol 3-propionate 17-acetate bis-methobromide
2β,16β-bis-pyrrolidino-androstanediol 3-propionate 17-acetate bis-methobromide
2β-piperidino-16β-dimethylamino-androstanediol 3-propionate 17-acetate bis-methobromide
Bis-dimethylamino-androstanediol 17-acetate bis-methobromide
Bis-diethylamino-androstanediol 17-acetate bis-methobromide
Bis-dipropylamino-androstanediol 17-acetate bis-methobromide
Bis-di-isopropylamino-androstanediol 17-acetate bis-methobromide
Bis-dibutylamino-androstanediol 17-acetate bis-methobromide
Bis-3'-azabicyclo[3',2',2']nonano-androstanediol 17-acetate bis-methobromide
2β-piperidino-16β-pyrrolidino androstanediol 17-acetate bis-methobromide
2β,16β-bis-pyrrolidino-androstanediol 17-acetate bis-methobromide
2β-piperidino-16β-dimethylamino-androstanediol 17-acetate bis-methobromide
Bis-morpholino-androstanediol 17-acetate bis-methiodide

We claim:
1. 2β,16β-diamino-androstane compounds having as only other substituents in 3α-position a substituent selected from the group consisting of hydroxyl and acyloxy, and in 17-position a substituent selected from the group consisting of keto, β-hydroxyl and β-acyloxy, wherein the acyloxy groups are derived from an acid selected from the group consisting of an inorganic acid and an organic carboxylic acid having 1 to 18 carbon atoms, and salts of these compounds which salts are selected from the group consisting of acid-addition salts and quaternary ammonium salts.

2. Novel diamino-androstanes of the formula:

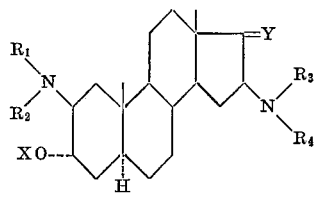

wherein X is selected from the group consisting of hydrogen and an acyl radical, derived from an acid selected from the group consisting of an inorganic acid and an organic carboxylic acid having 1 to 18 carbon atoms; Y is selected from the group consisting of O, H (βOH) and H (βOAcyl), wherein the acyl group is derived from an acid selected from the group consisting of an inorganic acid and an organic carboxylic acid having 1 to 18 carbon atoms; $R_1$, $R_2$, $R_3$ and $R_4$ are selected from the group consisting of hydrogen and an alkyl group having 1 to 6 carbon atoms, and salts of the above compounds selected from the group consisting of acid-addition salts and quaternary ammonium salts.

3. Novel diamino-androstanes of the formula:

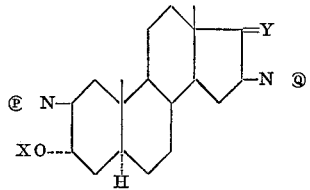

wherein X is selected from the group consisting of hydrogen and an acyl radical, derived from an acid selected from the group consisting of an inorganic acid and an organic carboxylic acid having 1 to 18 carbon atoms; Y is selected from the group consisting of O, H(βOH) and H(βOAcyl), wherein the acyl group is derived from an acid selected from an inorganic acid and an organic carboxylic acid having 1 to 18 carbon atoms; P and Q are heterocyclic rings derived from a five-, six- and seven- membered heterocyclic compound containing an NH- radical.

4. Novel quaternary ammonium compounds of the formula:

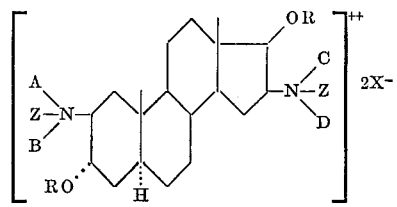

wherein
R is selected from the group consisting of hydrogen and an acyl group derived from a lower aliphatic carboxylic acid with 1–6 carbon atoms,
NAB and NCD are selected from the group consisting of a morpholino and a piperidino group,
Z is a lower alkyl group,
X is a halogen atom.

5. 2β,16β - bis - piperidino - androstane - 3α, 17β- diol-3-acetate dimethobromide.

6. 2β,16β - bis - piperidino - androstane - 3α, 17β- diol-3,7-diacetate dimethobromide.

References Cited

Hewett et al.: J. Pharm. Pharmacol 1964, 16 pp. 765–767.

HENRY A. FRENCH, Primary Examiner

U.S. Cl. X.R.
260—239.55, 397.4, 397.5, 999